TAPE RECORDER CABINET

Filed April 29, 1968

INVENTORS
Chester J. Barecki
William S. Lindberg
BY Dawson, Tilton, Fallon, and Lungmus
ATTORNEYS United States Patent Office 3,476,455
Patented Nov. 4, 1969

3,476,455
TAPE RECORDER CABINET

Chester J. Barecki and William S. Lindberg, Grand Rapids, Mich., assignors to American Seating Company, Grand Rapids, Mich., a corporation of Delaware Filed Apr. 29, 1968, Ser. No. 724,792
Int. Cl. A47b 77/08, 81/06; G11b 1/00
U.S. Cl. 312—223 2 Claims

ABSTRACT OF THE DISCLOSURE

A cabinet for tape recording or playing instruments provides vertically-aligned shelves flanked with side walls to provide chambers for the instruments which are releasably anchored upon the shelves, and horizontal shelves are provided in the cabinet laterally of the chambers and horizontally aligned with the chambers, the case being open at the front and closed at the rear by a board providing ventilating openings communicating with the chambers.

BACKGROUND AND SUMMARY

Figures 1, 2, 3:
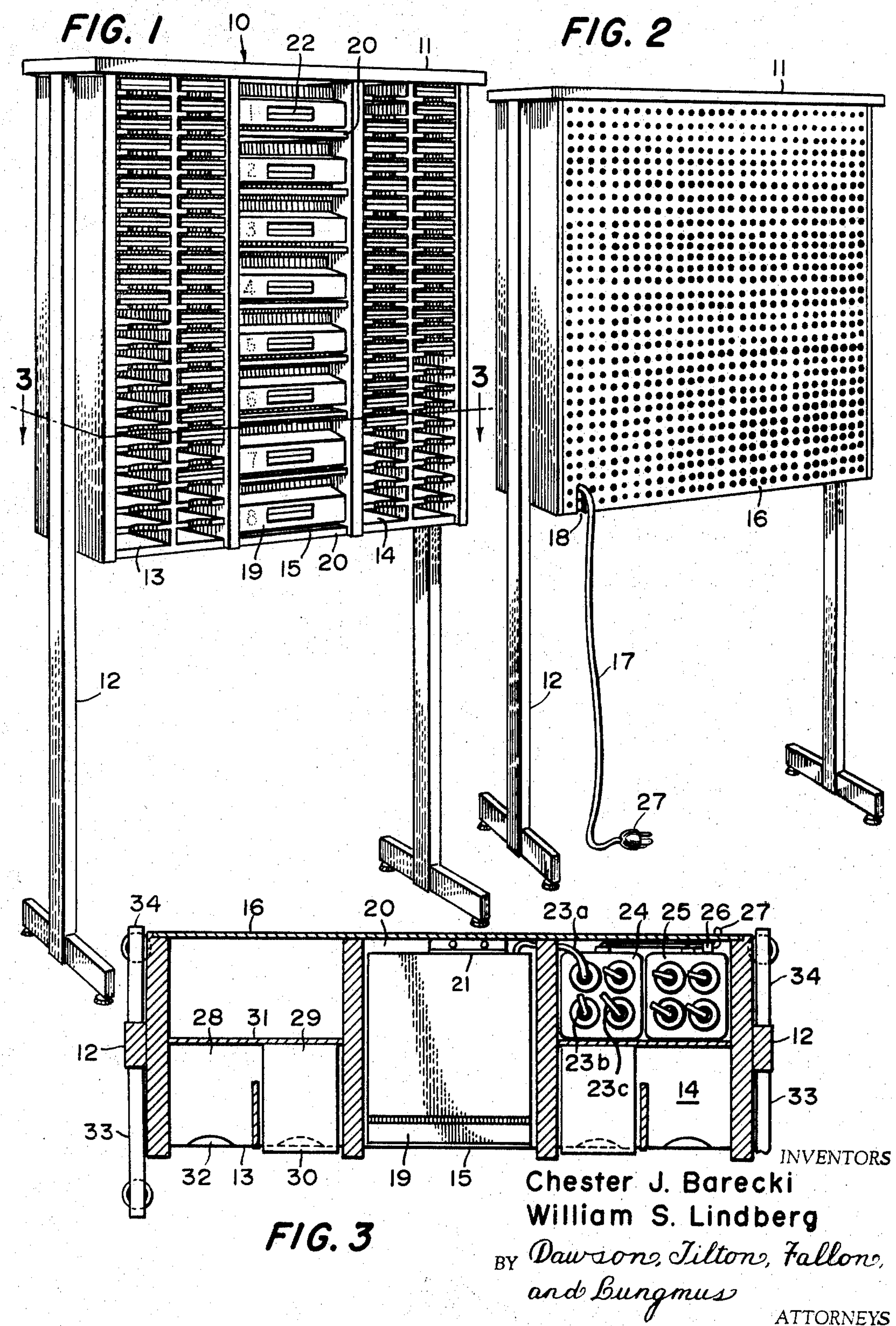

In Patent No. 3,330,955, an electronic study system is shown in which a plurality of light beam emitting sources are provided at the front of a room. The modulated light beam transmitter at these sources directs modulated light beams which may be picked up by a selector solar cell and a sound-reproducing mechanism on the desk of the student so that the light beams transmit to the student in sound a lecture or speech recorded on a tape deck. A gas-filled bulb and mechanism by which sound applied thereto causes light beams to be emitted and which serve as a carrier of sound, in that the modulated light beams are picked up by a selector solar cell and sound-reproducing mechanism, is well known.

Up to the present time, a problem has existed in obtaining a variety of programs. A dial retriever system calls for extensive wiring and complex arrangements. As a result, the students today have no control and are limited to the use of the tape deck which happens to be arranged in the hook-up.

We have discovered that it is possible to arrange a tape recorder and tape cartridge combination by which in effect a library of tape decks is provided for ready access so that a student may select a cartridge and have it placed in use in a selected circuit. The cabinet structure further provides a tamper-proof arrangement in which the recorder instruments are releasably anchored in place while the cartridges are conveniently stored for ready application to the instruments. Overheating of the instruments is prevented by the structure of the cabinet and ventilating equipment. The cabinet is compact and supports the cartridges in alignment with vertically-supported recorder instruments, and the cartridge chambers are recessed for ready access of the cartridges.

DRAWING

In the accompanying drawing, FIG. 1 is a perspective view of the storage cabinet taken from the front thereof and showing the cabinet equipped with tape recorders and partly filled with tape cartridges; FIG. 2, a perspective view of the rear of the cabinet; and FIG. 3, a horizontal sectional view of the cabinet taken at line 3—3 of FIG. 1.

DETAILED DESCRIPTION

In the illustration given, a case is supported upon legs to provide a tape recorder cabinet. Shelves in the central portion provide chambers in which the recorders are releasably anchored so that they may not be removed except by removal of the back board of the structure. The tape recorder chambers and instruments are flanked on each side by horizontal shelves which are partitioned to provide tape cartridge chambers. A back board is provided with ventilated openings which provide cooling, particularly for the back of the recorder chambers.

The term "tape recorder" is used herein in its broad sense to include a tape player as well as a tape recording instrument. A tape recorder not only records sounds, but also provides a playback, and therefore the term is used in its broad sense of both playing and recording.

In the specific embodiment shown in the drawing, a cabinet 10 provides a storage box or case 11 supported by legs 12. The cabinet case is divided into three vetrical sections, the two side sections providing storage shelves 13 and 14 on each side of a center section in which chambers 15 are provided for the tape recorders 19.

The front of the cabinet is open and the back of the cabinet is closed by a thin piece of board such as a "peg board" 16 which has numerous holes for ventilation. In the specific illustration given, the holes are about one inch apart vertically and horizontally and one-quarter inch in diameter. The ventilation holes are important in that they permit a passage of air through the cabinet and about the tape recorder instruments and thus free the tape recorders of a build-up of heated air which might otherwise occur.

As can be seen in the rear view of FIG. 2, the power cord 17 protrudes through a slot 18 in the lower corner of the back panel. The back panel is releasably secured by screws or other means so that the tape recorders are accessible from the rear. Each of the tape recorders is attached to its shelf 20 by a metal bracket 21. This prevents the tape recorder from being accidentally pulled off of the shelf when a tape cartridge 22 is removed from it. The several tape recorders have their power cords 23, **23*a*, 23*b*, 23*c*, etc. plugged into one of two junction boxes 24 or 25 located on the bottom shelf of the cabinet behind one of the storage sections of tape cartridges. A power cord 17 secured with a clamp 26 inside of the cabinet exits through a slot 18 in the back panel 16 and is adapted to be plugged into a power outlet in the room by means of the usual three-pronged plug 27**.

In the cartridge storage sections 13 and 14, each shelf 28 is deep enough to allow the cartridge 29 to be received therein, and preferably short enough to cause the cartridge to protrude slightly from the shelf 30 when the cartridge is resting against the rear wall 31 of the section. The shelf is recessed at 32 to allow a greater finger grip on the cartridge.

The leg standards 12 are preferably designed with forward-reaching legs 33 that protrude beyond the front of the cabinet, and with rearward-reaching legs 34 which space the cabinet from the rear wall to allow an upward surge of warm air from the cabinet panel holes or apertures.

In the operation of the structure, the student selects from the library of tape cartridges a specific labeled cartridge and inserts it into the desired instrument 19 and he may then proceed to his carrel or study booth, and by applying his selector tube to the light-emitting source now connected with the tape recorder instrument, he can receive the desired lecture. The tape recorder instrument is a well-known structure and need not be described in detail. When the tape cartridge is pressed into the aperture in the instrument, the leading end of the tape is gripped between a capstan and a roller and there is a take-off from the magnetic tape which is converted by the mechanism heretofore described into modulated light emitting from a light beam transmitter.

For ordinary use, the tape recorder instruments are permanently locked within the cabinet by the locking flange means 21, and it is only by removal of the peg board 16 that access is provided to the instrument. Thus, in the application and withdrawal of cartridges to the instruments, there is no danger of removing the instrument from its chamber. Circulation of air is provided about the legs of the cabinet and through the ventilated rear board 16, and this structure also maintains the library of cartridges at a convenient level and in horizontal alignment with the instrument chambers for ready insertion and removal of the cartridges.

While we have described a specific embodiment of the cabinet in considerable detail for the purpose of illustrating the invention, it will be understood that such details may be varied widely by those skilled in the art without departing from the spirit of our invention.

What is claimed is:

1. A tape recorder cabinet structure in which cartridges are to be inserted and removed from recorder instruments, comprising a case frame providing vertically-aligned shelves spaced apart and flanked with side walls to provide a vertical series of chambers for tape recorders, tape recorder instruments secured within said chambers each instrument being provided with a front opening for receiving a cartridge, side walls spaced from said first-mentioned side walls to provide side compartments, horizontal shelves in said side compartments horizontally aligned with said instrument chambers, and cartridges stored in said side compartments, said cabinet being open at the front thereof to allow the interchange of cartridges between the side compartments and said tape recorder openings.

2. The structure of claim 1 in which said recorder instrument within each chamber is spaced from the top of the chamber.

References Cited

UNITED STATES PATENTS

| | | | |
|---|---|---|---|
| 2,375,043 | 5/1945 | Shaffer | 312—8 X |
| 3,054,651 | 9/1962 | King et al. | 312—239 |
| 3,090,661 | 5/1962 | Hawkins | 312—213 |
| 3,185,307 | 5/1965 | Higgins | 211—40 |
| 3,210,142 | 10/1965 | Dewart | 312—213 |

CASMIR A. NUNBERG, Primary Examiner

U.S. Cl. X.R.

35—35, 60; 312—8, 213